Oct. 19, 1943.  R. T. LEMON  2,332,386
HATCH BEAM
Filed Dec. 26, 1941   7 Sheets-Sheet 1
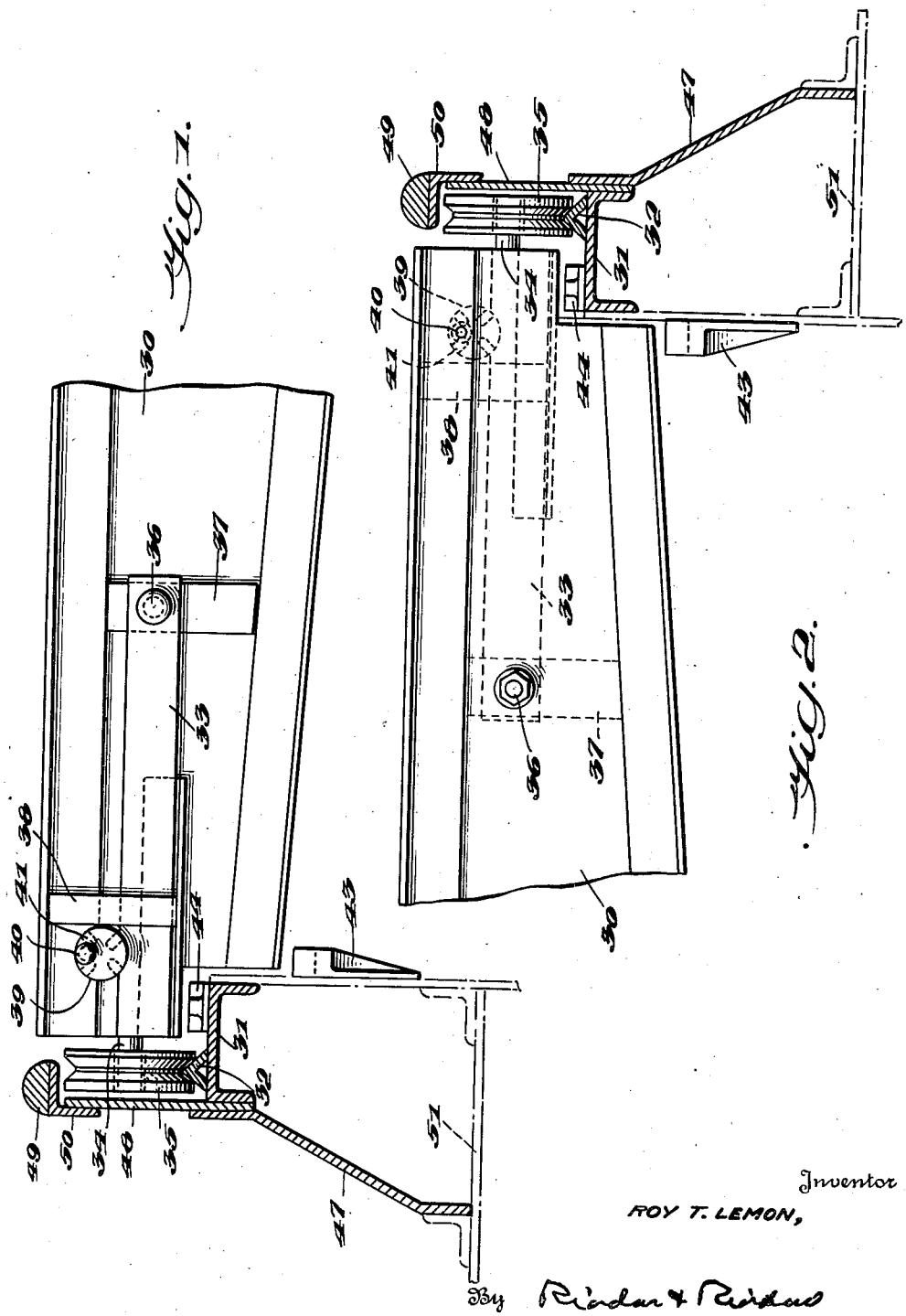
Inventor
ROY T. LEMON,
By Rieder & Rieder
Attorneys

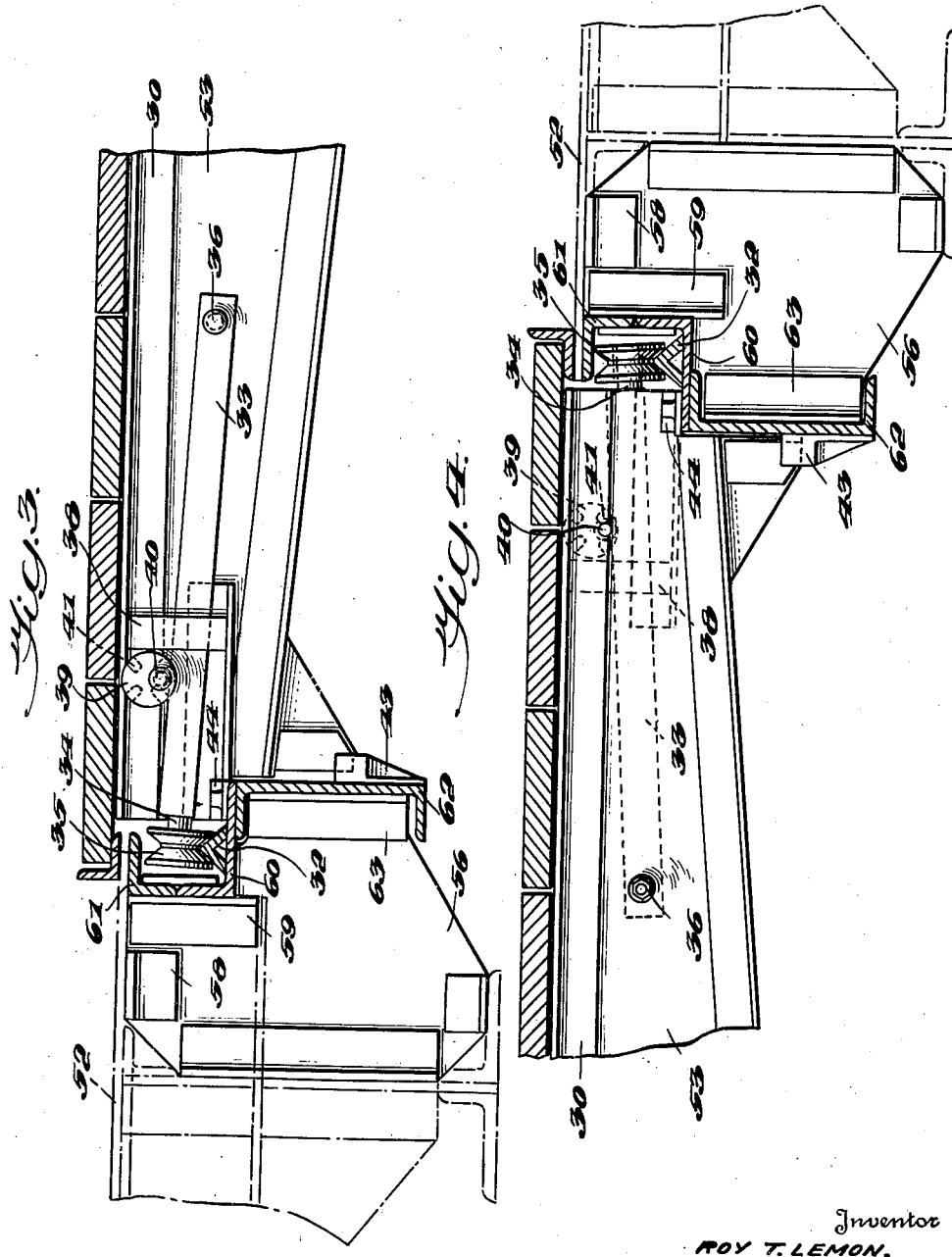

Oct. 19, 1943.   R. T. LEMON   2,332,386
HATCH BEAM
Filed Dec. 26, 1941   7 Sheets-Sheet 3
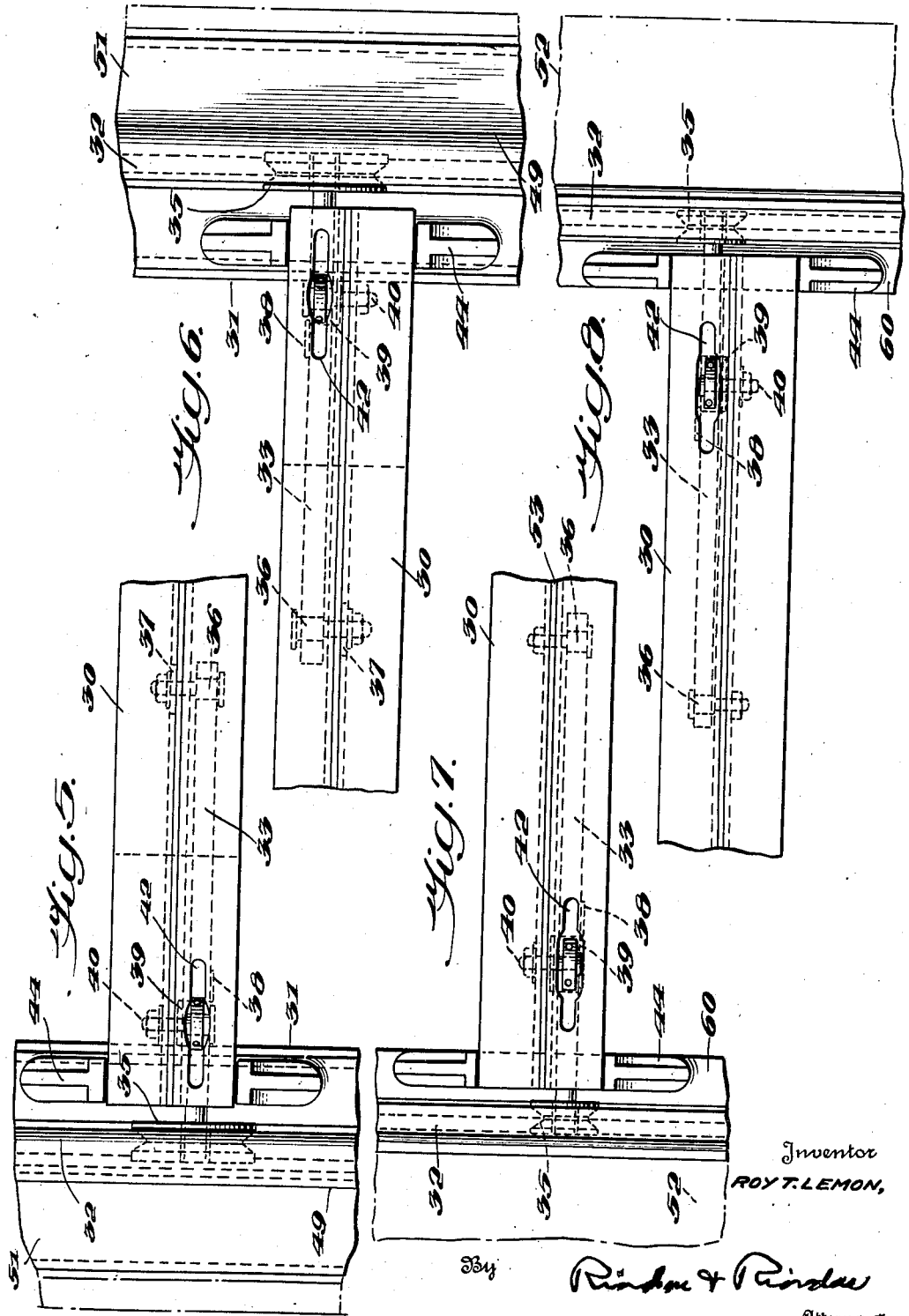
Inventor
ROY T. LEMON,
By Rindge & Rindge
Attorneys

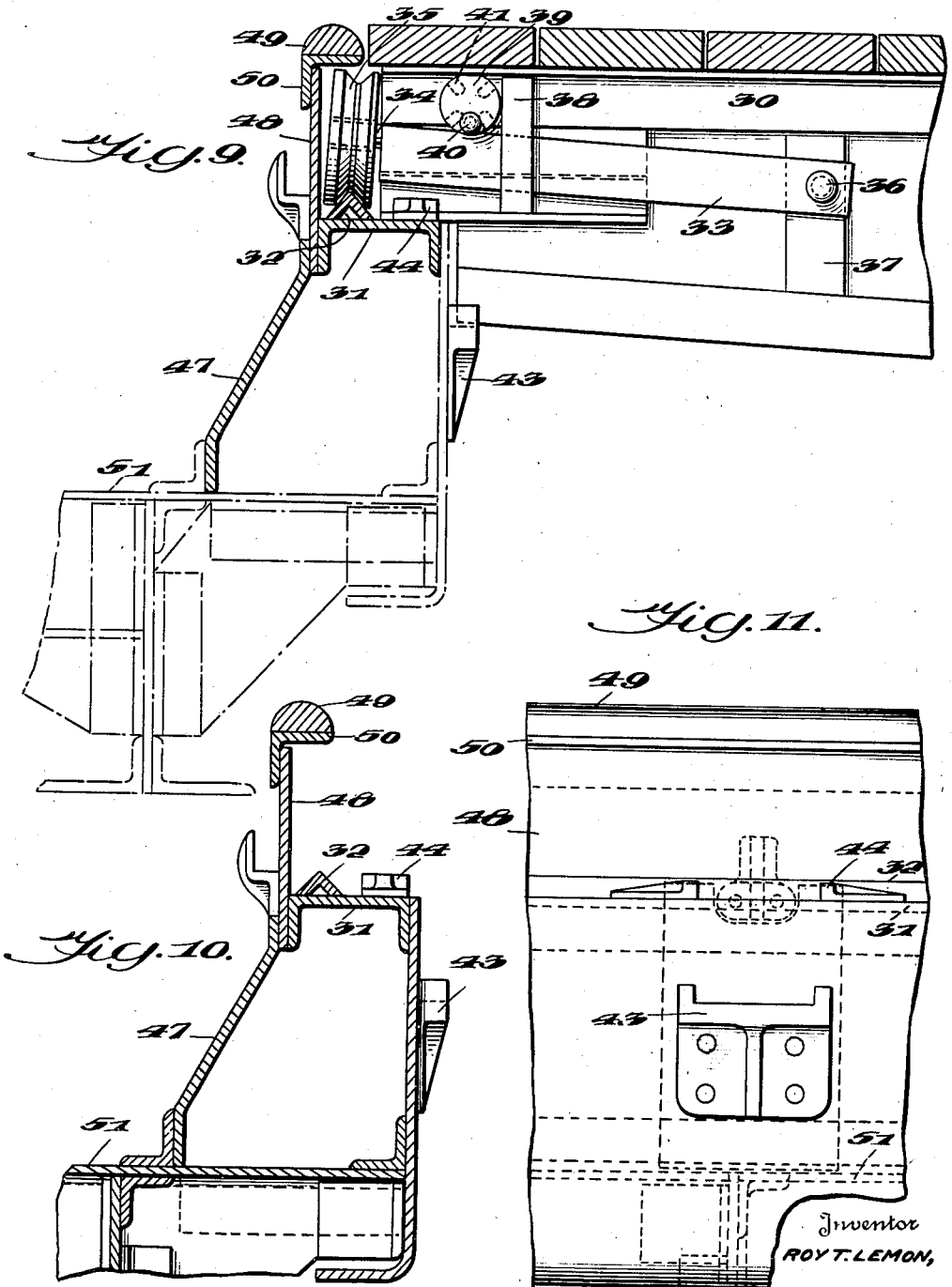

Oct. 19, 1943.                R. T. LEMON                2,332,386
                              HATCH BEAM
                        Filed Dec. 26, 1941            7 Sheets-Sheet 5
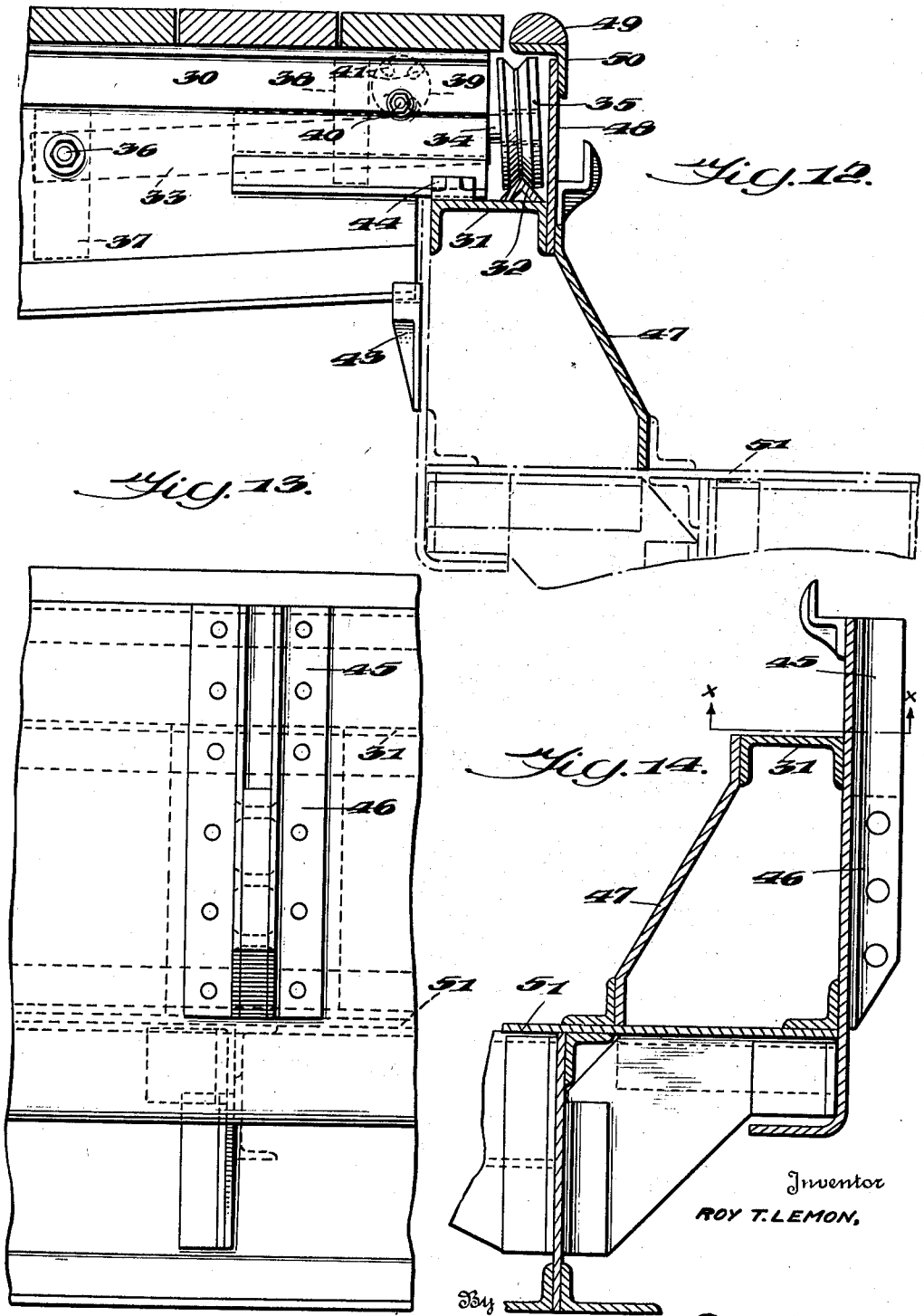
Inventor
ROY T. LEMON,
By
Riordon & Riordon
Attorney Oct. 19, 1943.   R. T. LEMON   2,332,386
HATCH BEAM
Filed Dec. 26, 1941   7 Sheets-Sheet 6
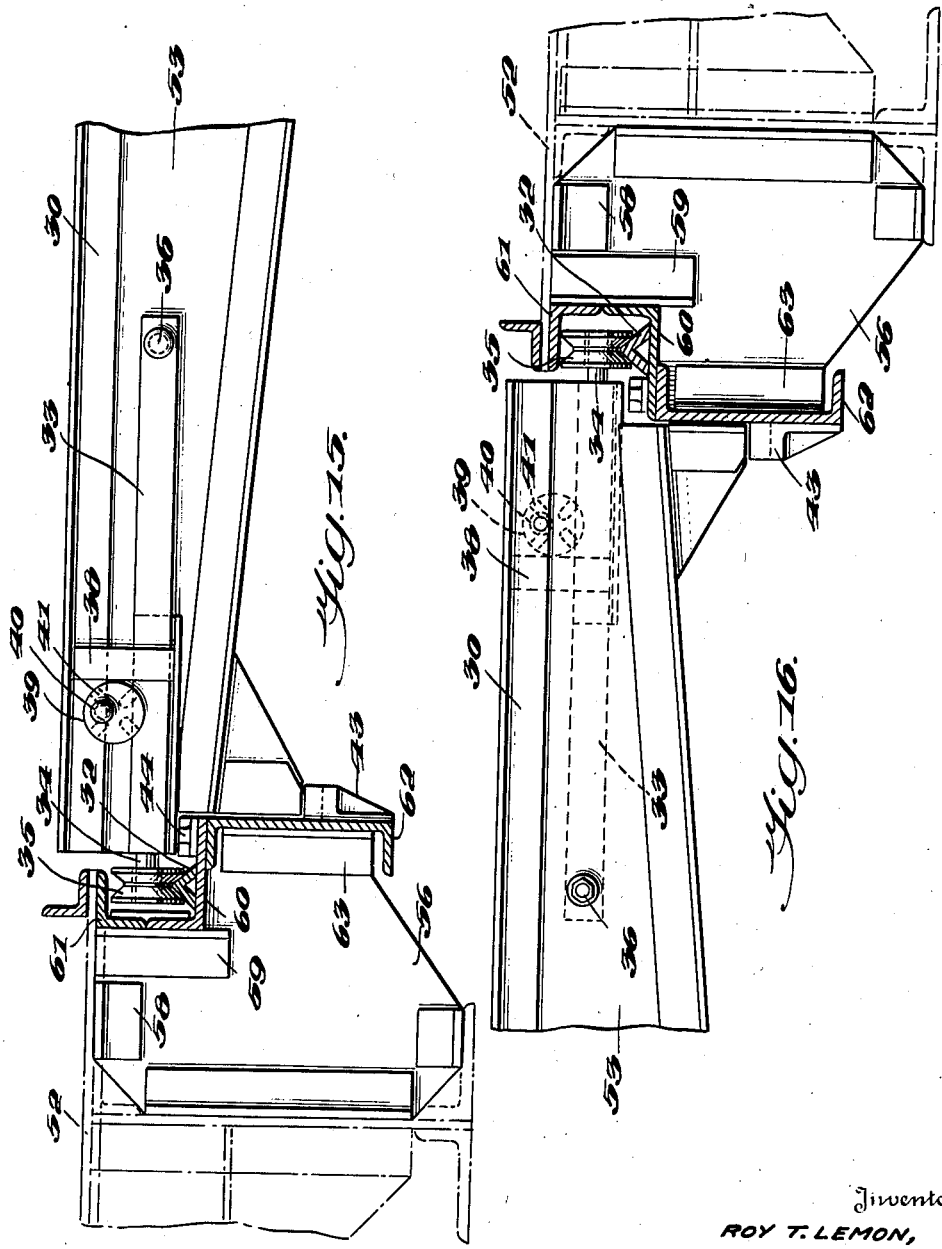
Inventor
ROY T. LEMON,
By Riordan & Riordan
Attorneys Oct. 19, 1943.    R. T. LEMON    2,332,386
HATCH BEAM
Filed Dec. 26, 1941    7 Sheets-Sheet 7
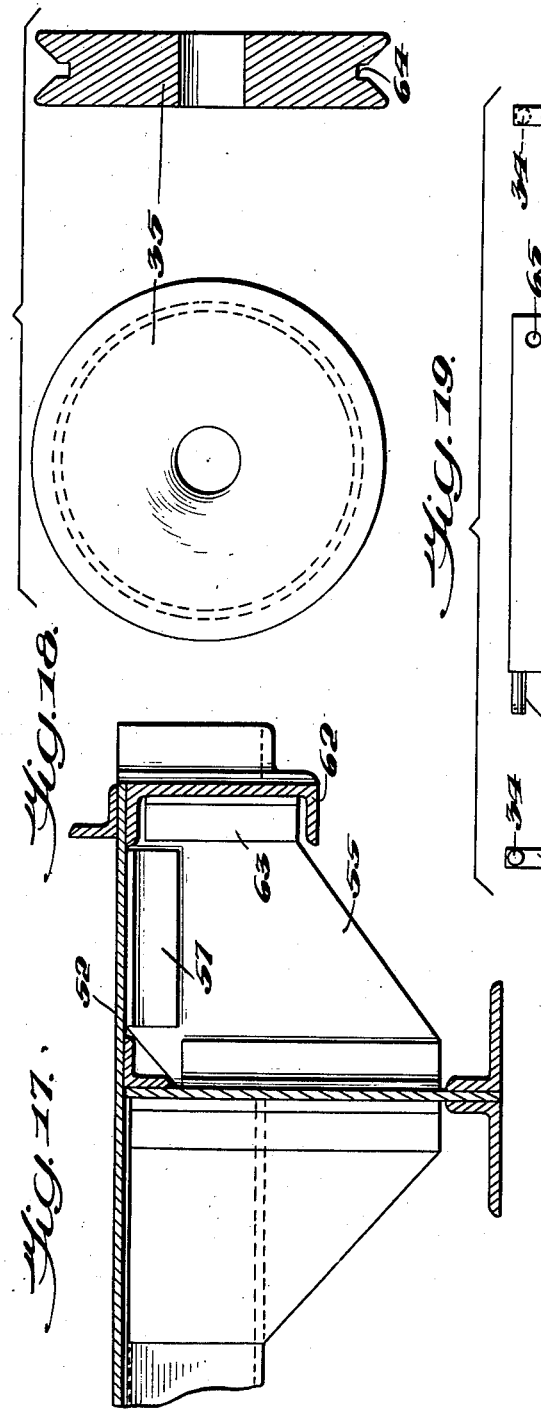
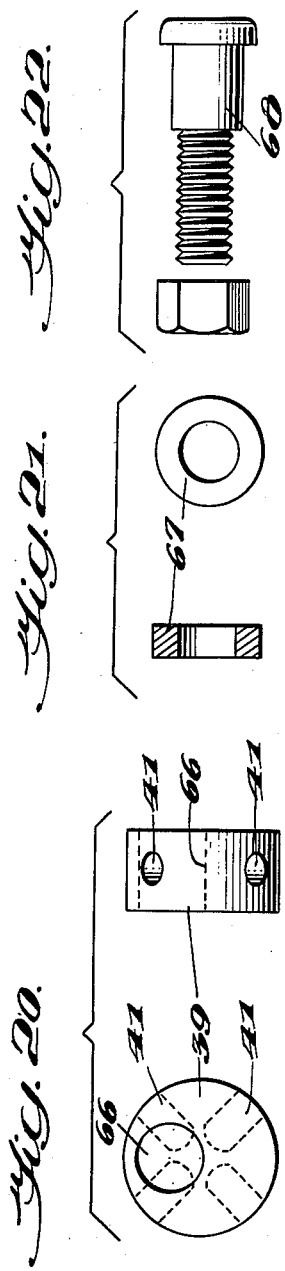
Inventor
ROY T. LEMON,
By Rindlar & Rindlar
Attorney Patented Oct. 19, 1943

2,332,386

UNITED STATES PATENT OFFICE 2,332,386

HATCH BEAM

Roy T. Lemon, Mobile, Ala., assignor to Waterman Steamship Corporation, Mobile, Ala., a corporation of Alabama Application December 26, 1941, Serial No. 424,549

1 Claim. (Cl. 114—201)

This invention relates to hatch beams and particularly to rolling hatch beams, for steam ships and other vessels. More particularly the illustrated embodiments of the invention are directed to rolling hatch beams for main deck hatches in ships of all types and to improvements and modifications in the rolling beam mechanism and accessory equipment.

The general object of the present invention is to improve the construction of such hatch beams, whereby they can be removed from their resting position to any unobstructed position along the hatchway with the greatest of dispatch and a minimum of labor.

Included among the objects is the provision of a simple, strong and durable self-contained rolling hatch beam which can be rolled by hand to either end of the hatchway.

Another object is the provision of means whereby such beams, instead of being removed from the hatchway, may be rolled along the hatchway and jacked together at each or either end, or placed in any position where they will be least obstructive. Thus the problem of stowing hatch beams on valuable deck space is eliminated.

Still another object of the invention is to provide ways and means whereby the hatches may be closed quickly for weather protection.

Further objects include reduction in the cost of labor required to remove and load hatch beams, elimination of accessories conventionally attached to this task, and reduction to a minimum of hazards heretofore attendant upon the removal and loading of hatch beams, by a design and arrangement which permits the beams to remain resting on the coaming channel.

To the attainment of the foregoing and other objects, which will appear as the description proceeds, reference may be made to the accompanying drawings, in which:

Fig. 1 is an elevation partly in section showing a main deck rolling beam in raised position for rolling forward or aft;

Fig. 2 is a view similar to Fig. 1 but showing the opposite side of the beam;

Fig. 3 is a sectional view partly in elevation, illustrating a 'tween deck rolling beam in lowered position;

Fig. 4 is a view similar to Fig. 3 taken from the opposite side of the beam;

Fig. 5 is a plan view of the rolling hatch beam, in accordance with Figs. 1 and 2 in raised position for rolling forward or aft;

Fig. 6 is a similar view taken from the other side of the beam;

Fig. 7 is a plan view of the rolling hatch beam, in accordance with Figs. 3 and 4, in raised position for rolling forward or aft;

Fig. 8 is a view similar to Fig. 7 taken from the other side of the beam;

Fig. 9 is a sectional view partly in elevation, illustrating details of hatch coaming and beam rests, showing the beam of Figs. 1 and 2 in lowered position;

Fig. 10 is a sectional view through the hatch coaming illustrating beam rests, with the beam removed;

Fig. 11 is a fragmentary elevation showing the hatch coaming and beam rests;

Fig. 12 is a section similar to Fig. 9, but taken from the other side of the beam;

Fig. 13 is a fragmentary elevation of a somewhat different hatch coaming from that shown in Fig. 11;

Fig. 14 is a sectional view partly in elevation similar to Fig. 10, but illustrating a different form of hatch coaming;

Fig. 15 is an elevation, partly in section, of the beam and coaming shown in Figs. 3 and 4, but illustrating the beam in raised position;

Fig. 16 is a view similar to Fig. 15, taken from the other side of the beam;

Fig. 17 is a section through an existing present 'tween deck hatch coaming;

Fig. 18 is a composite view showing a hatch beam roller in elevation and in section;

Fig. 19 is a composite detailed view showing side and end elevations of a pivot beam for the hatch beam;

Fig. 20 is a composite view showing front and side elevations of the lifting eccentric for the hatch beam;

Fig. 21 is a composite detail showing an elevation and section through a special hatch beam washer; and Fig. 22 is a composite view showing in elevation the pivot or cam bolt for the beam.

Referring now to the drawings wherein like reference numerals designate like parts, two forms of rolling beam have been illustrated. This has been done because the coaming, beam sockets and beam stops, as well as the proportions of the various parts, are slightly different in main deck hatch beam installations as compared with 'tween deck installations.

Certain of the views illustrate coaming structure quite similar to those currently in use, but as the description proceeds it will become evident just how such structure may be modified if found necessary for a given installation, to accommodate the improved rolling beam. The principle of the invention is the same however through the several forms of rolling beam.

In accordance with the invention, the rolling beams have been so designed that they can be supported on a roller shaft and lever arm. Roller shafts are pivotally mounted on each end of the beam and serve to carry rollers which preferably run upon a V track welded to the outboard side of the hatch coaming channels. Means are provided for elevating or raising the beam from its beam sockets, and when in raised position, the beam may be rolled manually, longitudinally fore and aft into any position desired.

The arrangement for raising and lowering the rolling beam from the beam sockets, contemplates eccentrics located near each end of the beams and self-contained in design, these eccentrics being positioned to actuate a combined lever arm and roller shaft, by means of which the beam is supported when in its raised position. By rotating the eccentric through 180 degrees, toward or from the lever arm, the roller shaft will be depressed or raised, and in turn will raise the beam until it is supported solely by rollers, or will lower it in place where the beam will be supported by the beam sockets and coaming.

Figs. 1 and 2 show a main deck hatch beam in its raised position supported by the rollers, Figs. 9 and 12 showing the same beam in its lowered position, supported by the beam sockets and coaming. Figs. 3 and 4 show a 'tween deck hatch beam in its lowered position, supported by the coaming, while Figs. 15 and 16 show the same beam in its raised position ready for rolling movement along the tracks.

Referring now particularly to Figs. 1, 2, 5, 6, 9 and 12, the hatch beam 30 is arranged to slide along and between coaming channels 31 on V tracks 32 which are welded to the top of the respective coaming channels. Pivotally mounted to the underside of the hatch beam adjacent each end are lever arms 33 which terminate respectively in roller shafts 34. Rollers 35 which are grooved to mate with the tracks 32 are mounted upon the shafts 34. The levers 33 are pivotally carried by pivot studs 36 which are in turn secured to the beam by means of struts 37, and are guided in their movements by combined lever guides and cam stops 38 located adjacent the outer ends of the beam. An eccentric or cam 39 is pivoted on an eccentric pin 40, above each lever arm 33, the web of the beam affording an excellent mounting for the pin. The cam 39 is formed with notches 41 for the reception of a suitable actuating lever, by means of which the cam may be rotated about its pivot 40. As shown in Figs. 5 and 6, the beam is provided with slots 42 to permit the insertion of such an actuating lever through the beam, from top side, into the holes or notches 41, thereby facilitating manipulation of the eccentric or cam, such that the beam may be raised or lowered.

The eccentric or cam 39 is so designed and mounted that turning it 180 degrees will either raise or lower the beam ends. In both extreme positions, i. e., depending vertically from its eccentric pin 40, or extending upwardly therefrom, the cam will lock in place by engagement with the cam stop and lever guide 38, friction between moving parts also assist in this locking action. When in its lower or depending position, as shown in Figs. 1 and 2 the lever arm will have caused the beam to rise by the leverage between the roller 35 and the pivot 36, and engagement of the eccentric 39 with the arm 33. When in its lowered position as shown in Figs. 9 and 12, the beam is permitted to settle on to the coaming channels and beam rests 43, and will be held in position by the beam stops 44 as well as by the beam rests 43 which are socketed for the purpose.

When in the raised position indicated in Figs. 1 and 2, it will be evident that the beam may be rolled manually along the tracks 32 to any desired position with respect to its hatchway. When in this position the weight of the whole assembly is on the rollers, and the whole assembly is elevated sufficiently high to clear the beam rests and beam stops.

When on the other hand the cam has been revolved counter-clockwise 180 degrees from its depending position, the roller shafts rise at the extremities of the lever 33, permitting the hatch beam to follow into its proper place. When in this position there is no stress on the roller shafts 34, rollers 35 or tracks 32, and thus this portion of the beam has an ultimate stress equivalent only to the weight of the rolling beam and its accessories.

The hatch beam stops 44 are welded to the coaming channel 31 at the proper intervals to accommodate the beam in its lowered position. Preferably the notches 41 in the eccentric are suitably distributed, and the slots 42 are of proper length to permit the rotation of the eccentric approximately 90 degrees for each throw of the actuating lever which an operator will insert.

In Fig. 14 is illustrated a form of hatch coaming quite similar to that now found on cargo vessels, and with some installations of the present invention, it may be found desirable to modify the illustrated arrangement, to accommodate a particular design of rolling beam, and accessories therefor. A preferred form of coaming and trackway is that illustrated in the figures already discussed, and the enlarged details of which appear in section in Fig. 10. To convert the structure of Fig. 14 into the preferred form of Fig. 10 it will be necessary to remove the section 45 on a plane parallel to the hatch coaming channel 31, as indicated by the line x—x in Fig. 14. Then the angle 46 may be removed, and in designated places beam rests or sockets 43 will be welded. The outboard side of the coaming channel adjacent to the bracket 47 will be severed, and between this bracket and the coaming channel 31, the coaming 48 may be inserted and welded. A chaffing bar 49 supported by an angle 50 may be welded to the coaming 48, and if not already present, beam stops 44 may be suitably located and welded to the coaming channel 31. All of this assembly, either form, will be, of course, secured to the main deck 51.

Of course, these suggestions for conversion of one hatch coaming to another apply only to the outboard sides of the coaming. It may be found that the fore and aft coaming will have to be projected to compensate for the additional width of the coaming athwartship, which additional width is produced by the removal of the section 45 from the inboard side of the coaming and addition of the coaming 48 to the outboard side of the channel 31.

Figs. 3, 4, 7, 8, 15 and 16 are directed to the application of the invention to hatch coamings and hatchways between decks of present cargo vessels. So far as the beam, its levers, roller shafts, rollers, and eccentric cam are concerned, there is little or no difference over the structure shown in Fig. 1, which has already been described, except perhaps some difference in size and proportions. Accordingly the same reference numerals are used in these figures to designate the elements which find their counterparts in Fig. 1 and no further description thereof is necessary.

But inasmuch as there are differences conventionally in the structure of a hatch coaming for the main deck of a ship, over that of hatch coamings for 'tween or lower decks, there will naturally, in the present invention perforce be some distinction in design of the hatch coaming for the roller beam when used on a 'tween hatchway. Fig. 17 illustrates a 'tween deck hatch coaming quite similar to conventional coamings on present day cargo vessels, and which may require some modification in design in order to employ and incorporate the rolling beam principle on lower decks. A preferred lower deck construction is that illustrated in Figs. 3, 4, 15 and 16. Should it be found desirable to modify the construction of Fig. 17, it may be done by removing the plate 55 (Fig. 17) and substituting therefor a plate 56 (Figs. 3 and 4), to comply with the desired design. The angle bracket 57 may be shortened to leave only the section 58, thus permitting introduction of an angle 59 running in a direction normal to that of the angle 58, for the purpose of providing a stiffener and support for a pair of angles 60 and 61 which may be matched with each to form a channel track and roller housing. Tracks 32 may conveniently be welded to the angle 60.

With this arrangement, the channel 62 illustrated in Fig. 17 may be removed, for re-location in the new position indicated in Figs. 3 and 4. Desirably angle clips 63 will be suitably located in the channel 62, for the sake of stiffness and rigidity.

With this arrangement it will be evident that the angle portion 60 forms a roller track bed resting on the channel 62, while the angle 61 completes the enclosure for the track and roller assembly 32, 35. All structural shapes will, of course, be held rigidly in the designated positions in accordance with standard engineering practice prevailing in the specific locality, or by the specifications as set up by the builder, it being understood that the assembly is, of course, secured in this particular showing, to the lower or 'tween deck structure 52.

It might be noted that because of the slight difference in beam structure, the struts 37 can be omitted and the pivot studs 36 be directly mounted in the web 53 of this particular beam arrangement.

Reference may now be made briefly to Figs. 18 to 22 inclusive, wherein structural details are illustrated in somewhat enlarged form. As can be seen from Fig. 18, the roller 35, preferably of cast iron and proportioned to the particular installation, is grooved in generally V configuration, to accommodate the V track 32. However, in order to avoid binding and to permit the rocking movement of which the roller partakes as the beam is raised or lowered, this V groove will terminate at its root in a circumferential depression or groove 64, rather than in a full V apex.

The combined lever arm and roller shaft 33—34, which for the sake of convenience may be termed a pivot beam is shown in Fig. 19. This pivot beam is preferably of steel, and two will normally be required for each rolling hatch beam, i. e., one pivot beam at each end of the hatch beam. The pivot beams will, of course, be suitably drilled as at 65 to receive the pivot studs 36.

Fig. 20 shows the eccentric cam 39, eccentrically drilled at 66 for the accommodation of eccentric pin 40, and illustrating the peripherally disposed holes or notches 41 which receive the actuating lever (not shown).

Figs. 21 and 22 are merely details of the type of brass washer 67, of which at least four will be required per hatch beam, and of the steel cam and pivot bolts 68, of which two for the cam and two for the pivot beam will be required per hatch beam.

Having thus described the invention, the operation and advantages thereof are believed to be readily apparent to those skilled in the art, it being understood, of course, that the principles of operation, the illustrated embodiments of structures for carrying out those principles, and the suggested modifications of one structure to another, are intended merely as illustrative, and not as limiting, except as defined in the claim appended hereto.

When a hatch beam is in its raised position, as shown in Figs. 1-2, and 15-16, it may be rolled along the hatchway to any position desired. All parts will clear, and all weight is taken by the rollers 35, the strut 37, the pivot beam 33—34, and, of course, the pivot 36 as well as cam 39. When it is desired to lower the same, the beam will be rolled to a position over the beam rests 43 and beam stops 44, a lever will be inserted through a slot 42 and into one of the notches 41 of the respective eccentric or cam 39. One movement of the lever, for the length of the slot 42, will serve to rotate the eccentric 90 degrees or one-half of the lowering distance, and the operation can be repeated whereupon the end of the beam will follow into position, and the roller 35 and no longer carry the load. Each end of the hatch beam will, of course, be similarly maneuvered. The beam is then locked into position by the beam rests and stops.

Many modifications will occur to those skilled in the art, and it is intended, within the limits, of the appended claim that such modifications are within the scope of this invention. For example, it will be noted that in effect, the pivot beam and eccentric cam arrangement is a jack, operable to raise and lower the hatch beam body on its rollers. Conceivably some other form of jack might be substituted, without in any wise deviating from the principles of the instant invention. Again, the construction of hatch coaming and trackways offer almost unlimited possibilities of variation, and may in fact be different for every installation. Various forms of camming means might be substituted for the particular eccentric cam illustrated herein, i. e., a sliding wedge or the like might conceivably be used.

Having thus described my invention, what I claim as new and desire to secure by Letters Patent of the United States is:

In a rolling hatch beam construction, the combination of a beam body, roller means for said body, and a trackway for said roller means, means to produce relative raising and lowering movements between said beam body and said trackway comprising a lever arm pivotally mounted on the beam body, a shaft carried by said lever arm for mounting said roller means externally of the beam body, and cam means on said beam body engageable with said lever means to actuate the same, and means affording access through the beam body to said cam means for purposes of adjustment of said cam means to produce said relative raising and lowering movements.

ROY T. LEMON.